US010055500B2

(12) United States Patent
Bolshinsky et al.

(10) Patent No.: US 10,055,500 B2
(45) Date of Patent: *Aug. 21, 2018

(54) OPTIMIZING SEARCHES

(71) Applicant: International Business Machines Corporation, Armonk, NY (US)

(72) Inventors: Leonid Bolshinsky, Karmiel (IL); Vladimir Gamaley, Rehovot (IL); Sharon Krisher, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 14/923,531

(22) Filed: Oct. 27, 2015

(65) Prior Publication Data

US 2017/0116270 A1    Apr. 27, 2017

(51) Int. Cl.
*G06F 17/30* (2006.01)

(52) U.S. Cl.
CPC .. *G06F 17/30867* (2013.01); *G06F 17/30463* (2013.01); *G06F 17/30699* (2013.01)

(58) Field of Classification Search
CPC ......... G06F 17/30867; G06F 17/30699; G06F 17/30463
See application file for complete search history.

(56) References Cited

U.S. PATENT DOCUMENTS

| 6,847,963 | B1 | 1/2005 | Paclat |
| 7,890,526 | B1 | 2/2011 | Brewer et al. |
| 8,631,001 | B2 | 1/2014 | Lawrence et al. |
| 8,751,521 | B2 | 6/2014 | Lee et al. |
| 8,949,250 | B1 | 2/2015 | Garg et al. |
| 2008/0243827 | A1* | 10/2008 | Sarma ............... G06F 17/30528 |
| 2012/0159090 | A1 | 6/2012 | Andrews et al. |
| 2013/0132519 | A1 | 5/2013 | Walsh et al. |
| 2013/0282704 | A1 | 10/2013 | Pantel et al. |
| 2014/0141793 | A1 | 5/2014 | Bello et al. |
| 2014/0188899 | A1 | 7/2014 | Whitnah et al. |
| 2014/0219167 | A1 | 8/2014 | Santhanam et al. |
| 2015/0124628 | A1* | 5/2015 | Norair .................. H04L 1/0061 |
|  |  |  | 370/242 |

(Continued)

FOREIGN PATENT DOCUMENTS

| WO | 2012050913 A1 | 4/2012 |
| WO | 2014018321 A1 | 1/2014 |
| WO | 2014158922 A2 | 11/2014 |

OTHER PUBLICATIONS

Bolshinsky et al., "Optimizing Searches", U.S. Appl. No. 15/621,405, filed Jun. 13, 2017, 25 pages.

(Continued)

*Primary Examiner* — Alexander Khong
(74) *Attorney, Agent, or Firm* — James H. Mayfield; William H. Hartwell (57) ABSTRACT

A method, executed by a computer, for optimizing searches includes receiving a boolean search query comprising a plurality of operators and operands and usage information corresponding to a user, determining modifications to be made to the boolean search query according to the usage information, and modifying the boolean search query according to the modifications. A computer program product and computer system corresponding to the above method are also disclosed herein.

20 Claims, 4 Drawing Sheets

(56) References Cited

U.S. PATENT DOCUMENTS

2015/0242536 A1* 8/2015 Surkov ............. G06F 17/30864
707/706
2017/0024433 A1* 1/2017 Neelakanthappa
......................... G06F 17/30442

OTHER PUBLICATIONS

IBM Appendix P, list of patents or patent applications treated as related, filed herewith, 2 pages.

* cited by examiner

OPTIMIZING SEARCHES

BACKGROUND OF THE INVENTION

The present invention relates generally to searching, and more specifically, to optimizing searches to reduce search loads.

In the field of searching, a query includes one or more search terms that a user enters into a search engine to satisfy his or her information needs. Search queries may be plain text or adhere to a specific syntax, and may contain special operators that include or exclude certain results. One manner of searching is text searching, which shows a user all of the locations in which the user's search phrase appears. Often, due to simultaneous search queries from multiple users, a search server's performance may degrade.

SUMMARY

As disclosed herein, a method, executed by a computer, for optimizing searches includes receiving a boolean search query comprising a plurality of operators and operands and usage information corresponding to a user, determining modifications to be made to the boolean search query according to the usage information, and modifying the boolean search query according to the modifications. A computer program product and computer system corresponding to the above method are also disclosed herein.

DETAILED DESCRIPTION

Embodiments of the present invention relate generally to searching for information, and more specifically, to optimizing searches to reduce search loads. When many users search at the same time, a search index or server may experience a high load that impacts performance. One approach to addressing high loads on search servers is by employing various quality of service (QoS) techniques. Quality of service may refer to the overall performance of a telephony or computer network, particularly the performance seen by the users of the network. Quality of service may also refer to the various techniques used to improve end-user performance. To quantitatively measure quality of service, several related aspects of the network service are often considered, such as error rates, bit rate, throughput, transmission delay, availability, jitter, etc. Some user queries, such as queries on social media, may be performed across all content databases which the user is able to access. Embodiments of the subject invention may optimize such searches by intelligently reducing the number of content databases in which a search engine searches for a user's query.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

Figure 1:
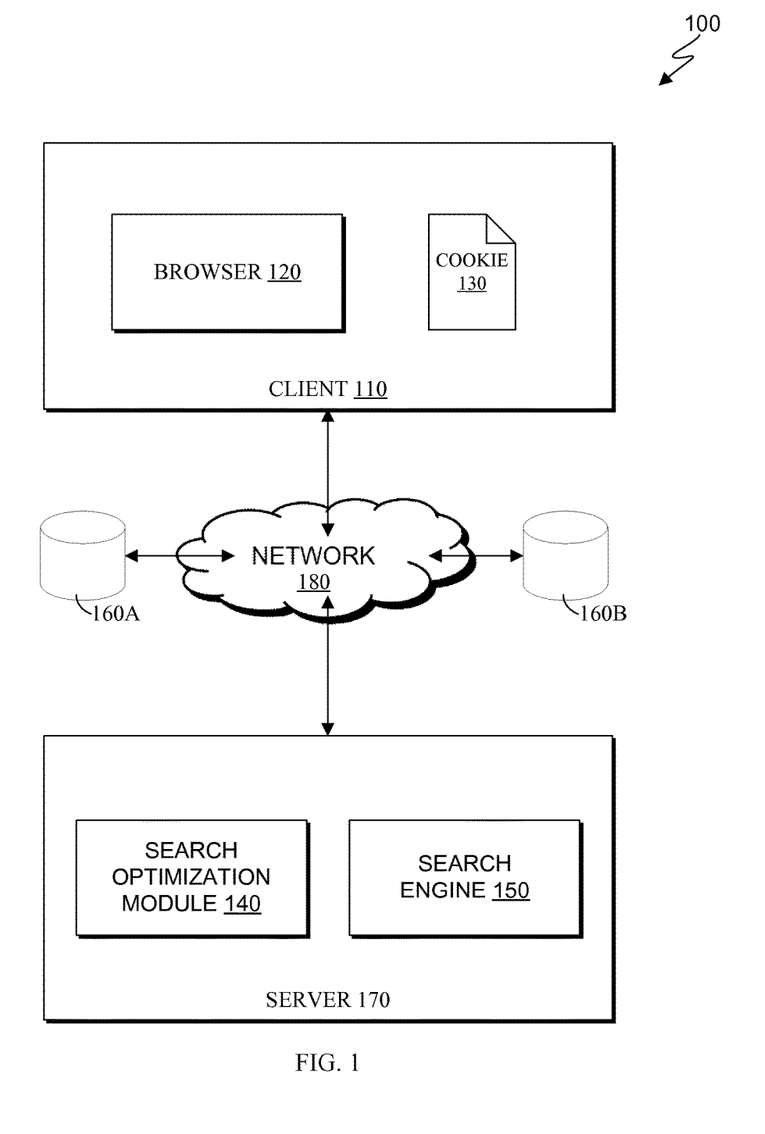
FIG. 1 is a block diagram depicting one embodiment of a search environment in accordance with the present invention.

FIG. 1 is a block diagram depicting one embodiment of a search environment 100 in accordance with the present invention. As depicted, the search environment 100 includes a client 110, browser 120, cookie 130, search optimization module 140, search engine 150, databases 160A and 160B, server 170, and network 180. The search environment 100 may enable users who are positioned client-side to use a central search server in order to find the targets of their search queries.

Client 110 may include a browser 120 and one or more cookies 130. The client 110 may reside on a user's device, such as a smartphone, laptop, tablet, or the like. In some embodiments, the user uses the browser 120 in order to access remote resources via a network such as network 180. The client 110 or browser 120 may generate the cookie 130. In some embodiments, the cookie 130 stores information such as a user's browsing history, which is a list of resources that a user accesses, the corresponding access times, and/or access frequency, etc. The cookie 130 may also store the user's preferences, such as which languages (English, Spanish, etc.), file types (text, pdf, etc.) and codecs (mp3, aac, etc.) that a user tends to prefer. The information in the cookie 130 may be communicated to a remove server, such as server 170, on occasion, such as on a prearranged schedule or whenever the cookie 130's information is updated. In some embodiments, the user history and preferences are stored directly on the search server rather than in a cookie.

Server 170 may include any network-accessible server that performs searches. In some embodiments, the server 170 is a central search server for multiple clients 110. The server 170 may include a search optimization module 140 and search engine 150. The search engine 150 may searches for and identify items in one or more databases and/or indices that correspond to a user's search query, (e.g. keywords or characters specified by the user). The search optimization module 140 may receive user queries from a client 110 and modify the query. The modified query may then be used by search engine 150 to search one or more databases 160A and 160B. The results of the search engine 150 are then returned to the client 110. Once a user has the results of the search engine 150, the user may use the browser 120 to browse particular items, such as webpages, pictures, or other digital media, located on network-accessible databases 160A and/or 160B.

Figure 2:
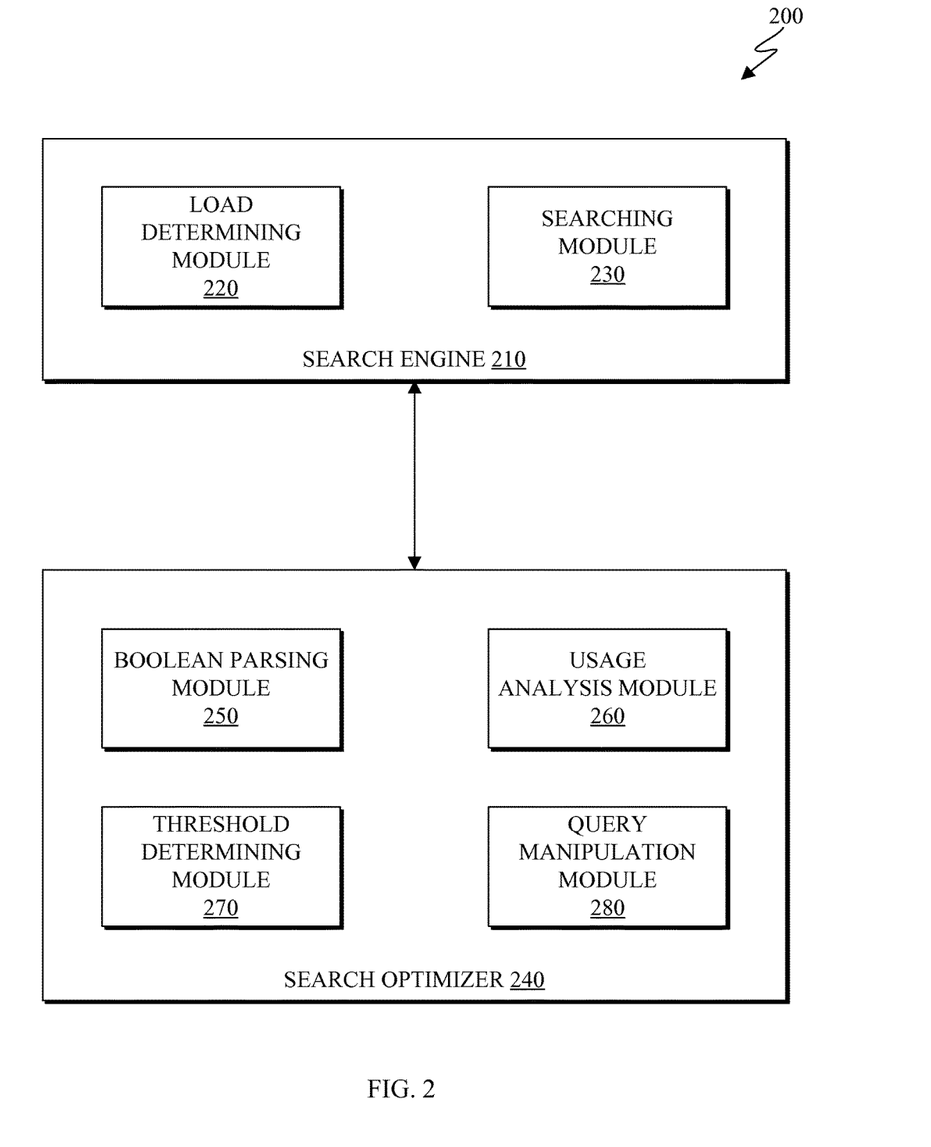
FIG. 2 is a block diagram depicting one embodiment of a search optimization system in accordance with the present invention.

FIG. 2 is a block diagram depicting one embodiment of a search optimization system 200 in accordance with the present invention. As depicted, the search optimization system 200 includes search engine 210, load determining module 220, searching module 230, search optimizer 240, boolean parsing module 250, usage analysis module 260, threshold determining module 270, and query manipulation module 280. The search optimizer 240 receives a query from a user and may modify the query before sending it to search engine 210.

The search engine 210 may search one or more databases and/or indices using a query for items that are relevant to the query. Searches may be performed using the searching module 230. For example, in a social media context, if a user searches for an artist named Joe Smith, the searching module 230 may search in several indexed locations using the query "Joe Smith," such as a user index, an event index, and a fan group/page index. The search engine 210 may then find and return to the user Joe Smith's personal page, his fan pages(s), and events at which he is performing. An index is a special data structure that enables searching of documents by the words contained in the document. Thus, indices may be designed to hold large amounts of textual data which enables very fast word searching. Each index may be local or remote, and indices may exist as a single instance or a clustered index.

The load determining module 220 monitors and keeps track of the performance of searching module 230, which may be negatively impacted when multiple users search at once. For example, load determining module 220 may determine that at one time, the computing resources allocated to searching module 230 are at 80% utilization, 100% utilization, 62.6% utilization, etc.

Search optimizer 240 may receive a search query from a user and make modifications to the query before sending to search engine 210. Search optimizer 240 first sends the query to boolean parsing module 250, which is then modified by query manipulation module 280 according to input from both usage analysis module 260 and threshold determining module 270.

Boolean parsing module 250 receives a user's search query and converts the query into a boolean-structured query based on certain search qualifiers, such as a user's group memberships, languages spoken, and the like. For example, boolean parsing module 250 may transform a user's query of "IBM" into boolean search:

Text:IBM AND (group:group1 OR group:group2 OR group:group3 OR group:community4) AND (language: es OR language:en)

This instructs the search engine to search for the text phrase "IBM" in group1, group2, group3, or community4, and to only search for results in Spanish or English. In this example, these particular search qualifiers are selected because the user may be a member of those four groups, and may desire results in English and Spanish. In some embodiments, the boolean parsing module 250 obtains the search qualifiers from a user's access control list, which is a list of resources to which the user has or does not have access, depending on whether the access control list is a whitelist or blacklist. The boolean parsing module 250 may then communicate the boolean search query to the query manipulation module 280.

The usage analysis module 260 may receive and analyze information about a user, such as the user's preferences and browsing habits. In some embodiments, the usage analysis module 260 determines which resources a user tends to visit frequently, such as the user's favorite websites, social media pages, etc. The usage analysis module 260 may also determine which resources that a user tends not to visit, despite having access. In some embodiments, the usage analysis module 260 determines user preferences such as preferred languages, file types, etc. For example, a user might speak French, English, and Spanish, and prefer to access resources that are in English primarily, and then French, and finally Spanish. Similarly, a user may prefer to read an HTML document over a PDF, and a PDF more than a plaintext resource. In some embodiments, the usage analysis module 260 analyzes data that it receives from cookie 110 in FIG. 1. The preferences that the usage analysis module 260 analyzes may be provided by a user.

The threshold determining module 270 may receive information relating to the performance of search engine 210. In some embodiments, the threshold determining module 270 receives information from the load determining module 220. The threshold determining module 270 may then determine if a particular performance threshold has been surpassed. In some embodiments, the thresholds are pre-defined. For example, the threshold determining module 270 may determine that, based on information received from the load determining module 220, the search engine 210 is at 90% utilization and therefore incoming queries should be significantly modified to increase performance at the expense of accuracy of the query.

The query manipulation module 280 may modify a boolean query based on information from the usage analysis module 260 and threshold determining module 270. The query manipulation module 280 may remove OR operands that represent resources that a user tends not to access, and add AND operands to constrain results into specific formats. For the boolean search Text:IBM AND (group:group1 OR group:group2 OR group:group3 OR group:community4) AND (language: es OR language:en)

The query manipulation module 280 may determine that group3 and community4 are to be removed, as they are not frequented by the user often, that Spanish-language results should be removed because the user rarely access Spanish resources, and the file type of the results should be limited to PDFs, as that is the user's predominantly-accessed file type. These modifications to the original boolean query would result in a manipulated query of Text:IBM AND (group:group1 OR group:group2) AND (language:en) AND (doc_type:pdf)

When an operand is removed, the associated operator is also removed. For example, if a query is x AND y AND z, and the y is removed, then an AND is also removed as the AND is associated with the y, resulting in x AND z. The manipulated query may improve search performance by requiring far less resources of the search module 230, since now the search module 230 is only searching in half the number of groups, is skipping over every language besides English, and is not searching for any document type besides PDF.

The degree to which the query manipulation module 280 adds AND operands and removes OR operands may depend on input received from the threshold determining module 270. For example, the query manipulation module 280 may not modify the boolean query at all if the utilization of the search engine 210 is below a certain threshold, such as 20% utilization. The query manipulation module 280 may only remove the least-popular operand of the groups, community4, if the threshold is between 20% and 50%, and the query manipulation module 280 may remove the next least-popular group, group3, if the threshold surpasses 70%, etc. After the query manipulation module 280 determines how and to what extent to modify the query, the query is modified, and then sent to search engine 210 for searching.

Figure 3:
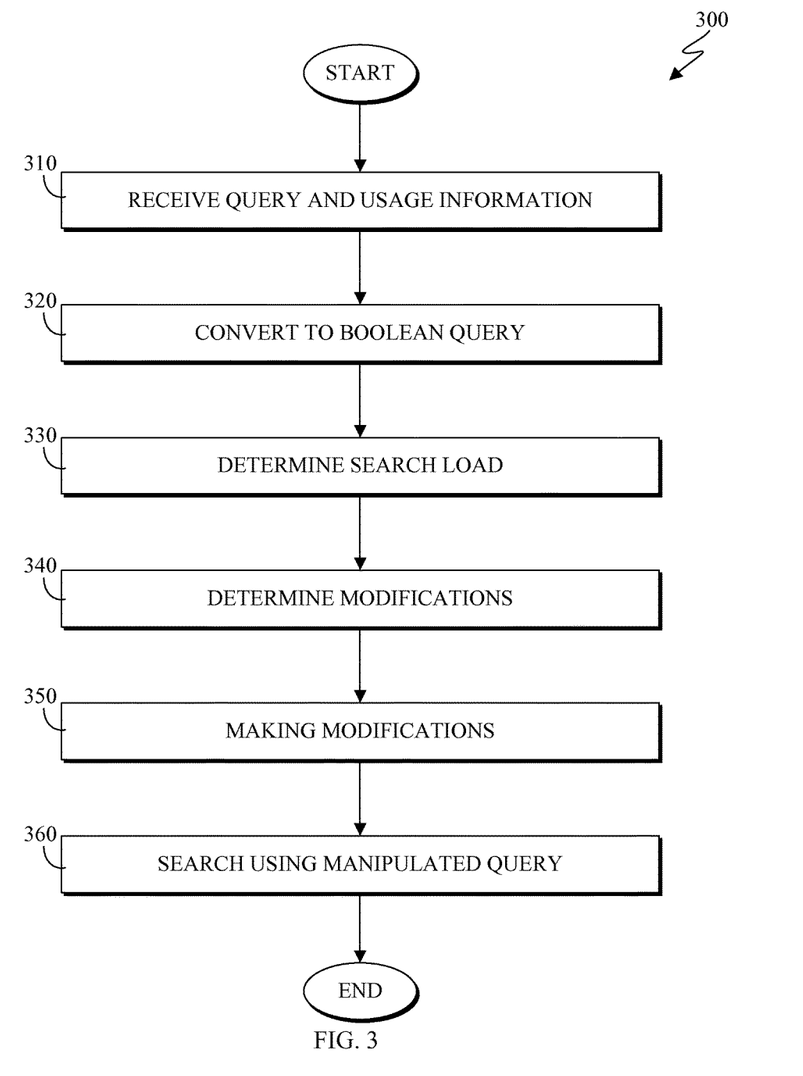
FIG. 3 is a flowchart depicting one embodiment of a search optimization method in accordance with the present invention.

FIG. 3 is a flowchart depicting one embodiment of a search optimization method 300 in accordance with the present invention. As depicted, the search optimization method 300 includes receiving (310) a query and usage information, converting (320) the query to a boolean query, determining (330) the search load, determining (340) modifications, making (350) the modification, and searching (360) using the manipulated query. The search optimization method 300 thus receives a user's query and modifies it into a query that will be less resource-intensive for a search engine while maintaining accurate results.

Receiving (310) a search query and usage information may include receiving from a user the user's query. In some embodiments, the search query may be inputted into browser 120 and sent to server 170. The usage information may be stored and/or transmitted via a cookie, such as cookie 130.

Converting (320) the query to a boolean query may include expanding a plain text query into a boolean-structured query. For example, if a user searches for "IBM," the boolean query may become:

Text:IBM AND (group:group1 OR group:group2 OR group:group3 OR group:community4) AND (language:es OR language:en)

This boolean logic structure instructs a search engine, such as search engine 210, where and how to search for the text "IBM." In this example, the search occurs in either group1, group2, group3, or community4, and searches in either Spanish- or English-language resources. The boolean search term may then be sent to the search optimizer 240. Every group and language category may be considered an operand, and AND and OR are operators.

Determining (330) the search load may include determining the resources allocated to a search server, and how much of the resources the search server is currently using or expected to use in the future. Resources may include cpu, memory, and storage resources. When a search load is high, the quality of service falls for users, as they may have to wait in a queue for their search results.

Determining (340) modifications may include determining which AND operators and operands to add to a boolean query, and which OR operators and operands to remove from a query. This may be performed by the query manipulation module 280 using input from the threshold determining module 270 and usage analysis module 260. As a search load increases in heaviness, the boolean query may be further modified; similarly, if the search load is light, the boolean query may only be slightly modified, if at all.

Making (350) the modifications may include removing the OR operands and operators, and adding the AND operands and operators that were identified in the modification determination operation 340. Searching (360) using the manipulated query may include using a search engine to search one or more of the indicated resources using the search term. Once the results of the modified query are discovered, the results may be returned to the user. In some embodiments, the results are returned to browser 120.

Figure 4:
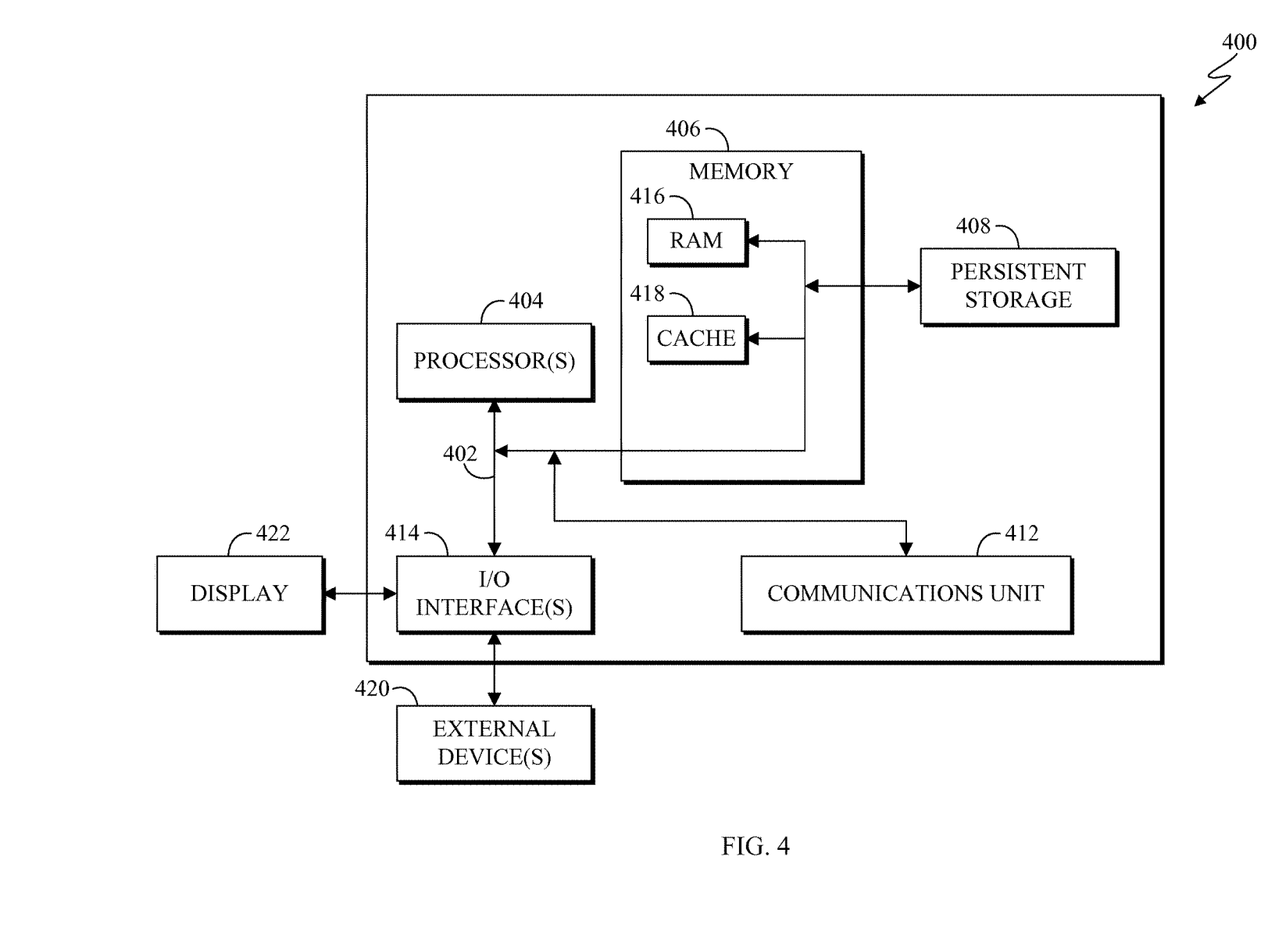
FIG. 4 is a block diagram depicting one example of a computing apparatus (i.e., computer) suitable for executing the methods disclosed herein.

FIG. 4 is a block diagram depicting components of a computer 400 suitable for executing the methods disclosed herein. It should be appreciated that FIG. 4 provides only an illustration of one embodiment and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In the depicted embodiment, memory 406 includes random access memory (RAM) 416 and cache memory 418. In general, memory 406 can include any suitable volatile or non-volatile computer readable storage media.

One or more programs may be stored in persistent storage 408 for execution by one or more of the respective computer processors 404 via one or more memories of memory 406. The persistent storage 408 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 408 via I/O interface(s) 414. I/O interface(s) 414 may also connect to a display 422. Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer system for optimizing searches, the computer system comprising:
   one or more computer processors;
   one or more computer readable storage media;
   a search server including a search engine; and
   program instructions stored therein for execution by at least one of the one or more computer processors, the program instructions comprising instructions to:

receive a boolean search query comprising a plurality of operands and corresponding operators and usage information corresponding to a user, wherein the usage information is stored in a cookie and comprises user browsing information, user language preferences, and user file type preferences;

determine a search load of the search engine, wherein the search load includes an amount of resources of the search server that are being utilized;

in response to determining that the search load is greater than a pre-defined threshold, determine modifications to be made to the boolean search query according to the usage information;

modify the boolean search query according to the modifications; and perform a search using the modified boolean search query.

2. The computer system of claim 1, wherein the instructions to modify the boolean search query comprise instructions to remove an OR operand and a corresponding OR operator when an operand is an OR operand, and instructions to add an AND operand and a corresponding AND operator when an operand is an AND operand.

3. The computer system of claim 1, wherein:
the user browsing information stored in the cookie includes a list of resources that the user accesses, corresponding access times for the list of resources, and corresponding access frequencies for the list of resources,
the user language preferences stored in the cookie include a first language and a second language, and
the user file type preferences include one or more preferred file types and codecs.

4. The computer system of claim 2, wherein the OR operand comprises a resource that the user has not accessed after a selected time threshold.

5. The computer system of claim 2, wherein the OR operand comprises a resource that has not been updated after a selected time threshold.

6. The computer system of claim 2, wherein the operand comprises a language.

7. The computer system of claim 2, wherein the operand comprises a file type.

8. A computer program product for optimizing searches, the computer program product comprising:
a computer readable storage medium and program instructions stored on the computer readable storage medium, the program instructions comprising instructions to:
receive a boolean search query comprising a plurality of operands and corresponding operators and usage information corresponding to a user, wherein the usage information is stored in a cookie and comprises user browsing information, user language preferences, and user file type preferences;
determine a search load of a search engine located on a search server, wherein the search load includes an amount of resources of the search server that are being utilized;
in response to determining that the search load is greater than a pre-defined threshold, determine modifications to be made to the boolean search query according to the usage information;
modify the boolean search query according to the modifications; and
perform a search using the modified boolean search query.

9. The computer program product of claim 8, wherein the instructions to modify the boolean search query comprise instructions to remove an OR operand and a corresponding OR operator when an operand is an OR operand, and instructions to add an AND operand and a corresponding AND operator when an operand is an AND operand.

10. The computer program product of claim 8, wherein:
the user browsing information stored in the cookie includes a list of resources that the user accesses, corresponding access times for the list of resources, and corresponding access frequencies for the list of resources,
the user language preferences stored in the cookie include a first language and a second language, and
the user file type preferences include one or more preferred file types and codecs.

11. The computer program product of claim 9, wherein the OR operand comprises a resource that the user has not accessed after a selected time threshold.

12. The computer program product of claim 9, wherein the OR operand comprises a resource that has not been updated after a selected time threshold.

13. The computer program product of claim 9, wherein the operand comprises a language.

14. The computer program product of claim 9, wherein the operand comprises a file type.

15. The computer system of claim 3, wherein determining modifications to be made to the boolean search query according to the usage information further comprises:
in response to determining the search load exceeds a first utilization threshold, removing, from the boolean search query, an operand determined to be the third least-popular operand based on the list of resources that the user accesses.

16. The computer system of claim 15, wherein determining modifications to be made to the boolean search query according to the usage information further comprises:
in response to determining the search load exceeds a second utilization threshold, removing, from the boolean search query: (i) an operand determined to be the second least-popular operand based on the list of resources that the user accesses, and (ii) a second language preference.

17. The computer system of claim 16, wherein determining modifications to be made to the boolean search query according to the usage information further comprises:
in response to determining the search load exceeds a third utilization threshold, removing, from the boolean search query: (i) an operand determined to be the next least-popular operand based on the list of resources that the user accesses, and (ii) a preferred file type.

18. The computer program product of claim 10, wherein determining modifications to be made to the boolean search query according to the usage information further comprises:
in response to determining the search load exceeds a first utilization threshold, removing, from the boolean search query, an operand determined to be the third least-popular operand based on the list of resources that the user accesses.

19. The computer program product of claim 18, wherein determining modifications to be made to the boolean search query according to the usage information further comprises:
in response to determining the search load exceeds a second utilization threshold, removing, from the boolean search query: (i) an operand determined to be the second least-popular operand based on the list of resources that the user accesses, and (ii) a second language preference.

20. The computer program product of claim 19, wherein determining modifications to be made to the boolean search query according to the usage information further comprises:
in response to determining the search load exceeds a third utilization threshold, removing, from the boolean search query: (i) an operand determined to be the next least-popular operand based on the list of resources that the user accesses, and (ii) a preferred file type.

\* \* \* \* \*